United States Patent [19]

Köhler et al.

[11] Patent Number: 5,109,108

[45] Date of Patent: Apr. 28, 1992

[54] HEXAHYDROTRIAZINETRIONE-CONTAINING POLYARYLENE SULPHIDE

[75] Inventors: Burkhard Köhler; Rolf-Volker Meyer, both of Krefeld, Fed. Rep. of Germany

[73] Assignee: Bayer Aktiengesellschaft, Leverkusen, Fed. Rep. of Germany

[21] Appl. No.: 565,128

[22] Filed: Aug. 10, 1990

[30] Foreign Application Priority Data

Aug. 22, 1989 [DE] Fed. Rep. of Germany ....... 3927657

[51] Int. Cl.$^5$ ............................................. C08G 75/16
[52] U.S. Cl. ................................... 528/367; 528/388; 528/503
[58] Field of Search .................................. 528/367, 388

[56] References Cited

U.S. PATENT DOCUMENTS 3,699,087 10/1972 Wood et al. .......................... 260/79
4,548,971 10/1985 Martinovich et al. ............... 524/101

Primary Examiner—Harold D. Anderson
Attorney, Agent, or Firm—Connolly & Hutz

[57] ABSTRACT

The invention relates to new hexahydrotriazinetrione-containing high molecular weight polyarylene sulphides (PAS), preferably polyphenylene sulphides (PPS), and a process for their preparation.

3 Claims, No Drawings

HEXAHYDROTRIAZINETRIONE-CONTAINING POLYARYLENE SULPHIDE

The invention relates to new hexahydrotriazinetrione-containing high molecular weight polyarylene sulphides (PAS), preferably polyphenylene sulphides (PPS) and a process for their preparation.

Polyarylene sulphides are inert thermoplastics of high temperature resistance which also allow a high degree of filling with glass fibers and/or other organic fillers. The use of these polymers, in particular polyparaphenylene sulphide (PPS), is increasing, especially in fields previously reserved for thermosets.

One disadvantage of PPS is the unsatisfactory toughness, although this increases as the melt viscosity increases. For some uses, the rapid crystallization of PPS is also a disadvantage, e.g. in the production of films. The tendency towards rapid crystallization is also lower in PPS types of high melt viscosity.

Processes for the preparation of high molecular weight branched polyarylene sulphides are known, e.g. U.S. Pat. No. 3,354,129, 3,699,087, 3,524,835 and 3,793,256 and EP-A 53 385, 64 300 and 91 088. In these processes, the high molecular weights are achieved by a curing step, for example by curing of polyarylene sulphides with oxygen.

A disadvantage of using gaseous reagents is the poor meterability. Post-crosslinking on the finished moulding is now scarcely possible. The latter also applies to after-treatment with sulphur, which escapes for the most part as hydrogen sulphide during the curing process [Polym. Degradation and Stability 11, 55 (1985)]. These disadvantages are avoided by using disulphonic acids for subsequently increasing the melt viscosity (U.S. Pat. No. 3,339,301). However, disulphonic acids cause an uncontrollably rapid increase in the melt viscosity during the after-treatment. Unreacted curing reagent furthermore remains in the polymer and can impair some properties of the PAS, e.g. the electrical properties.

Polyarylene sulphides, preferably polyphenylene sulphides, the molecular weight of which can be increased without addition of curing reagents, would therefore be desirable.

It has now been found that hexahydrotriazinetrione-containing polyarylene sulphides, preferably polyphenylene sulphides, which are prepared by incorporation of 1,3,5-tri-(halogenoaryl)-hexahydro-s-triazine-2,4,6-triones, the trimerization products of the particular halogenoaryl isocyanates, into the PAS chain show an increase in the melt viscosity on heating.

The invention therefore relates to branched polyarylene sulphides prepared by reaction of 0.1–20 mol %, preferably 1–5 mol %, compounds of the formula (I)

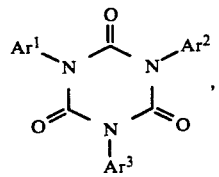

with 80–99.9 mol % compounds of the formula (III)

Hal-Ph-Hal     (III), in which $Ar^1$–$Ar^3$ can be identical or different and correspond to the general formula (II)

$R^1$–$R^3$ can be identical or different and represent a $C_1$–$C_{22}$-alkyl, preferably methyl, a $C_6$–$C_{14}$-aryl, preferably phenyl, or a $C_7$–$C_{22}$-aralkyl or alkylaryl radical, preferably a benzyl radical, or represent Hal, and two radicals in the ortho-position can be members of a ring numbering up to 7 ring atoms, Hal denotes fluorine, chlorine, bromine or iodine, preferably chlorine, and Ph is a para- or meta-phenylene, any desired naphthylene or a 4,4'-diphenylene radical with a sulphide-liberating reagent and an inorganic base in a dipolar-aprotic solvent in a manner which is known per se.

Examples of comonomers of the formula (I) are 1,3,5-tri-(m-chlorophenyl)-hexahydro-s-triazine-2,4,6-trione, 1,3,5-tri-(p-chlorophenyl)-hexahydro-s-triazine-2,4,6-trione, 1,3,5-tri-(3,4-dichlorophenyl)-hexahydro-s-triazine-2,4,6-trione, 1,3,5-tri-(3-chloro-4-methylphenyl)-hexahydro-s-triazine-2,4,6-trione etc. They can be prepared in a known manner e.g. from the corresponding halogenoisocyanates by heating in butyl acetate, chlorobenzene or o-dichlorobenzene using a basic catalyst.

The polyarylene sulphides according to the invention can be prepared e.g. by reaction of the monomers of the formula (I) and (II) with a sulphide-liberating reagent and an organic base in a dipolar-apriotic solvent by a process analogous e.g. to that described in EP-A 171 021.

Inorganic bases and sulphide-liberating reagents which are employed in a known manner are preferably alkali metal sulphides, particularly preferably sodium sulphides. Dipolar-aprotic solvents which are employed are e.g. N-alkyllactams, preferably N-methyllactams, and particularly preferably N-methylcaprolactam.

The reaction can be carried out in the presence of catalysts, such as caprolactam, amino acids or alkali metal acetates, chlorides, fluorides and aryl- or alkylsulphonates.

The reaction temperature is 150°–300° C. The reaction can be carried out under pressure of 1–50 bar.

1 to 2, preferably 1 to 1.1, equivalents, based on the sum of monomers of the formula (I) and (III), of the alkali metal sulphide are employed. The volume ratio of solvent to solid is between 1:1 and 10:1.

The alkali metal sulphides can be employed in anhydrous form or as hydrates. The dehydration can be carried out in one or more steps, preferably by e.g. azeotropic removal of the water by distillation, e.g. with the monomers of the formula (III) themselves as the entraining agent. If appropriate, alkali metal hydroxides are employed for regeneration of the alkali metal sulphides.

The reactants can be in principle by brought together in any desired form. The dihalogenoaromatics of the formula (III) and the comonomers of the formula (I) can be added together for separately, continuously, in portions or directly all at once to the alkali metal sulphide, the solvent or in portions to a part thereof. The comonomers of the formula (I) are preferably only added when no further water is present in the batch.

The alkali metal sulphide can also be added together with the solvent or a part thereof to the compounds of the formula (I) and (III). It is also possible for all the reactants to be brought together directly. Other combinations of the addition of the reactants are likewise possible.

The metering time of the reaction partners can be up to 10 h, preferably 0.1 to 5 h, and the after-condensation time 3–24 h, preferably 6–14 h.

The reaction mixture can be worked up and the polyarylene sulphides according to the invention can be isolated in a known manner, e.g. by precipitating the reaction mixture in an alcohol, e.g. isopropanol, and washing the polyarylene sulphide which has precipitated, e.g. after acidification, until free from electrolytes. Water is preferably employed as the washing liquid.

The melt viscosity of the polyarylene sulphides according to the invention increases by thermal after-treatment. It is increased by heating the hexahydro-triazinetrione-containing polyarylene sulphides prepared to 100°–400° C., preferably to 200°–330° C., for 1–100 min. Heating can be carried out under an inert gas (e.g. $N_2$ or Ar) or in vacuo. The polyarylene sulphides after-treatment with heat are distinguished by a very high melt viscosity and a low rate of crystallization.

The polyarylene sulphides according to the invention are suitable, by themselves or as a blend with other polymers, e.g. for the production of shaped articles, e.g. by the process of injection moulding or extrusion, for the production of fibers and films etc.

The polyarylene sulphides according to the invention can be blended with other polyphenylene sulphides, e.g. with those having a melt viscosity of 5–500 Pa.s (306° C./1,000 l/s).

EXAMPLES

Comparison example 608.24 g (4.16 mol) p-dichlorobenzene and 2.5 l N-methylcaprolactam are initially introduced into a 4 l steel kettle and heated to 216° C., and a mixture of 1,149.3 g (8.94 mol) sodium sulphide trihydrate, 325 g water, 4 g (0.1 mol) sodium hydroxide and 141.1 g (1.24 mol) caprolactam is added dropwise so that the bottom temperature remains at 215° C. During this, the water added and the water of hydration distils off. During the sodium sulphide addition, 608.24 g (4.16 mol) p-dichlorobenzene are added dropwise. The addition takes 4 h. The mixture is then heated at 240° C. for 9 h and the batch is drained into 40 l isopropanol. After acidification to pH 1, the polymer which has precipitated out is filtered off and washed with distilled water until free from electrolytes.

Example 1

0.1 mol less p-dichlorobenzene is initially introduced and instead 0.1 mol 1,3,5-tri-(m-chlorophenyl)-hexahydro-s-triazine-2,4,6trione is added, after dehydration.

Example 2

0.3 mol less p-dichlorobenzene is initially introduced and instead 0.3 mol 1,3,5-tri-(m-chlorophenyl)-hexahydro-s-triazine-2,4,6-trione is added, after dehydration.

Example 3

0.1 mol less p-dichlorobenzene is initially introduced and instead 0.1 mol 1,3,5-tri-(3-chloro-4-methyl-phenyl(-hexahydro-s-triazine-2,4,6-trione is added, after dehydration.

Example 4

0.1 mol less p-dichlorobenzene is initially introduced and instead 0.1 mol 1,3,5-tri-(3,4-dichlorophenyl)-hexahydro-s-triazine-2,4,6-trione is added, after dehydration.

Example 5

0.1 mol less p-dichlorobenzene is initially introduced and instead 0.1 mol 1,3,5-tri-(4-chlorophenyl)-hexahydro-s-triazine-2,4,6-trione is added, after dehydration.

Example 6

0.3 mol less p-dichlorobenzene is initially introduced and instead 0.3 mol 1,3,5-(4-chlorophenyl)-hexahydro-s-triazine-2,4,6-trione is added, after dehydration.

The following table summarizes the melt viscosities and thermal data of the polyarylene sulphides from examples 1–5 and the values of the samples subjected to thermal after-treatment. $T_c$ denotes the crystallization temperature, $H_k$ the heat of fusion and $T_m$ the melting temperature. The values were determined by DSC measurements. The melt viscosity was determined at 306° C. and a shear stress of 1,000 Pa.

| Example | Heating time at 310° C. (min) | Melt visc. (Pa · s) | $H_k$ (J/g) | $T_c$ (°C.) | $T_m$ (°C.) |
|---|---|---|---|---|---|
| Comp. | 0 | 100 | 45 | 235 | 280 |
| 1 | 0 | 150 | 38 | 229 | 277 |
| 1 | 10 | 3,000 | 42 | 233 | 279 |
| 1 | 60 | 4,500 | 38 | 221 | 275 |
| 2 | 0 | 9 | 33 | 217 | 278 |
| 2 | 10 | 95 | 43 | 206 | 278 |
| 3 | 0 | 91 | 41 | 235 | 277 |
| 3 | 10 | 150 | 41 | 227 | 276 |
| 3 | 60 | 20,000 | 16 | 169 | 256 |
| 4 | 0 | 10 | 49 | 237 | 282 |
| 4 | 10 | 18 | 44 | 207 | 282 |
| 5 | 0 | 77 | 48 | 226 | 280 |
| 6 | 0 | 2 | 49 | 232 | 279 |

Example 7

A compound is prepared from 40% glass fibers, 0.5% microtalc, 9.5% polyarylene sulphide according to example 3 and 50% of a polyphenylene sulphide having a melt viscosity of 44 Pas.

Comparison Example

A compound is prepared from 40% glass fibers, 0.5% microtalc and 59.5% polyphenylene sulphide having a melt viscosity of 44 Pas.

| Example | Flexural strength (MPa) | Outer fibre strain (%) | E modulus (MPa) | Izod impact strength (kJ/m²) |
|---|---|---|---|---|
| Comp. | 249 | 1.9 | 13,000 | 30 |
| 7 | 280 | 2.1 | 13,000 | 38 |

We claim:

1. Branched polyarylene sulphide prepared by reaction of 0.1–20 mol % of at least one monomer of the formula

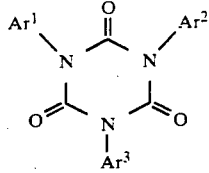

with 80–99.9 mol % of at least one of the formula

Hal-Ph-Hal in which $Ar^1$–$Ar^3$ are identical or different and each corresponds to the formula

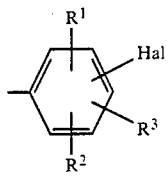

$R^1$–$R^3$ are identical or different and each represents a $C_1$–$C_{22}$-alkyl, a $C_6$–$C_{14}$-aryl, a $C_7$–$C_{22}$-aralkyl, or $C_7$–$C_{22}$-alkylaryl radical, or Hal, or tow radicals in the ortho-position are members of a ring having up to 7 carbon atoms, Hal represents fluorine, chlorine, bromine or iodine, and Ph is a para- or meta-phenylene, naphthylene or a 4,4'-diphenylene radical, with a sulphide-liberating reagent in a dipolar-aprotic solvent in the presence of an organic base.

2. Branched polyarylene sulphide according to claim 1 wherein Hal is chlorine.

3. A shaped article of the polyarylene sulphide according to claim 1.

* * * * *